United States Patent Office 3,830,940
Patented Aug. 20, 1974

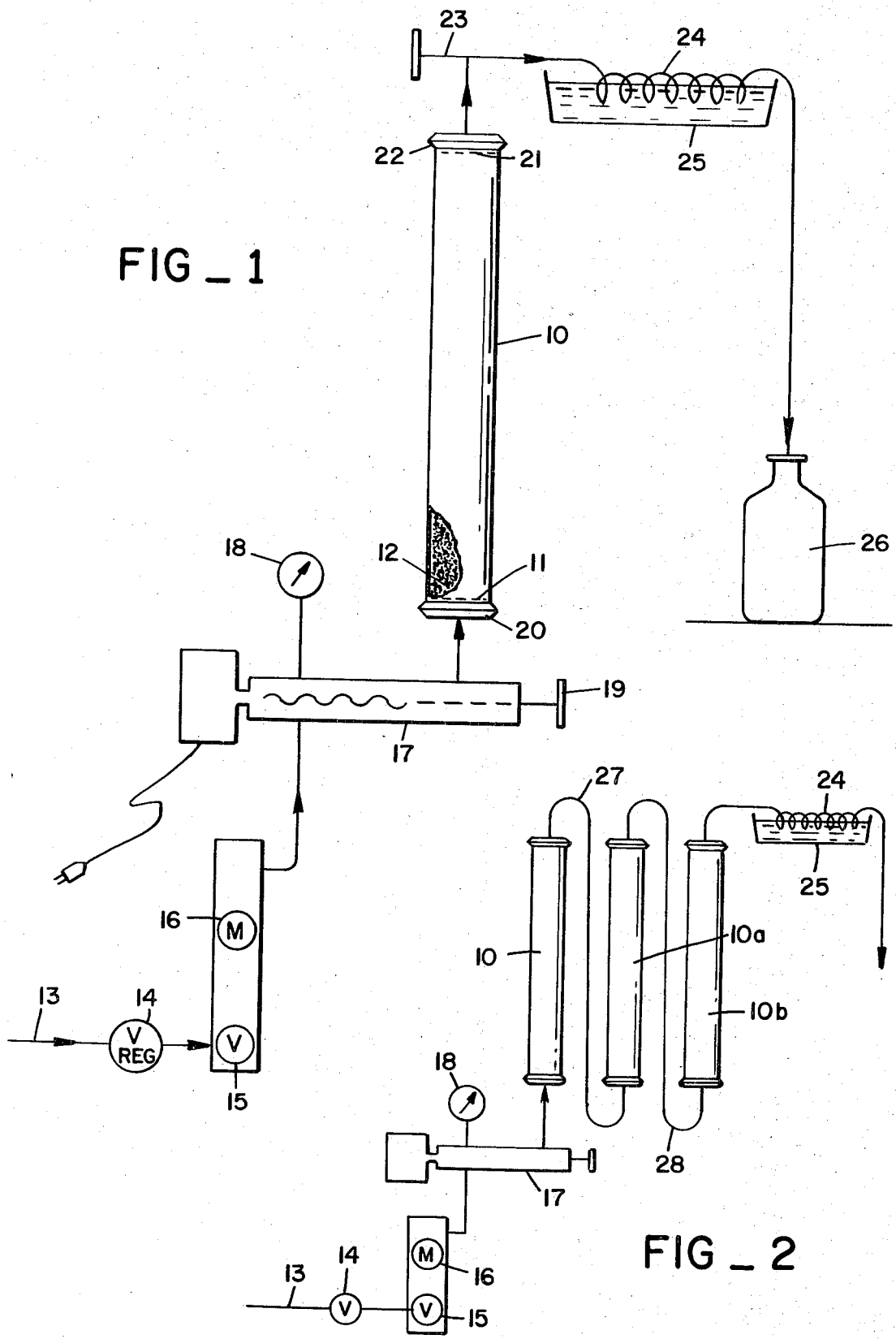

3,830,940
PREPARATION OF AQUEOUS BEVERAGE CONCENTRATE OF COFFEE
Michael Sivetz, 3635 NW. Elmwood Drive, Corvallis, Oreg. 97330
Filed June 7, 1972, Ser. No. 261,552
Int. Cl. A23f 1/08
U.S. Cl. 426—148
10 Claims

ABSTRACT OF THE DISCLOSURE

A process for preparing an aromatic and flavorful, relatively flavor-stable aqueous coffee beverage concentrate containing almost all the aromatic volatile constituents and about 18% of the non-volatile flavored solubles. The concentrate is prepared from columnar beds of finely ground roast coffee beans. The column sizes have a height to diameter ratio of at least six, and the column diameters are less than nine inches. Pressurized hot water flows upwardly through the vertical columns, venting air and gases, facilitating wetting and minimizing channeling. The effluent concentrate from the top of the column is collected mostly at ambient temperatures, and yields about fifty-five fluid-ounce cups of diluted beverage from each pound of original roast and ground coffee.

BACKGROUND OF THE INVENTION

The field of coffee beverage preparation has made only limited progress in domestic and institutional brewing, and has, especially in the last decade, based its criteria of beverage quality mostly upon the non-volatile solubles yields and concentrations in the prepared beverages. The level of research investment outside of the instant coffee manufacturing field, e.g. in proper brewing and brewing equipment, has been woefully small as demonstrated by the lack of innovation in this field, the lack of application of scientific principles, and simplistic approaches that made non-evaporative solubles the prime criterion of a proper brewing process. Similarly, instant coffee manufactures have progressively increased their solubles yields from roast and ground coffees, in order to increase profits, and they have compensated for quality losses by additions of volatile flavors and expressed coffee oil to the extracted solubles. In any case, existing instant coffee compositions are chemically quite different from freshly brewed coffee compositions. In both fields, many of the natural coffee aromatics, flavors and textural qualities have been markedly altered in processing. Even the widespread use of filter papers in beverage preparation has contributed foreign tastes, while removing much of the flavor associated with colloidal fines and oils.

The domestic steam-pumping percolator used by about 70% of U.S. citizens is a natural steam distiller, spreading volatile coffee constituents through the room but stripping the beverage of its potential quality. Even urn brewers shower hot water over relatively coarse granules, not only steaming off the volatile constituents which are so desired, but exhaustively extracting by virtually pure water, which is devoid of any chromatic buffering effect. Commercial instant coffee extractors operate at high temperatures that cause hydrolysis of normally insoluble constituents and cause deterioration of the delicate aldehyde aromas. The attainment of high extract concentrations of 25 to 35% solubles at 40 to 50% solubles yield from roast and ground coffee requires high levels of flavor holdup in the system, maintained for hours, drastically altering the original natural components. There have been cases of dilute, non-hydrolyzed extracts being manufactured, but their subsequent concentration by vacuum evaporation, reverse osmosis, or even freeze concentration have contributed to flavor losses and alterations. Spray-dried and freeze-dried instant coffees do not measure up to the natural aroma and flavor potential of the original roast and ground coffee, and in many cases neither does domestic or institutional brewing.

One object of the present invention is to prevent the present great losses in coffee aroma and flavors prior to consumer use, by more efficient brewing or extraction.

Another object of this invention is to provide a more stable refrigerated or frozen concentrate, that can be utilized with less menial repetitive labor and brewing equipment, less waste during and after preparation as well as greater taste pleasure.

A further object of the invention is based on the fact that non-evaporative solubles are only a portion of the coffee flavor, indeed the less satisfying portion, and the invention seeks to preserve the volatile evaporative solubles like acetaldehyde, diacetyl, other homologous aldehydes, esters, acids, sulfides, etc. which are an important and vital part of a good tasting cup of coffee.

Systematic tasting has shown the importance of the evaporative coffee (volatiles) solubles. For example: average non-evaporative solubles fall into the following pattern:

This invention: 0.8 to 0.9 wt. percent solubles in potable beverage
Freeze-dried instant: 1.10 to 1.30 wt. solubles
Urn/0.5 Gal beverages: 1.15 to 1.35 wt. solubles
Spray-dried instant: 1.30 to 1.50 wt. solubles Gas chromataographic analyses instruments on coffee volatiles, have shown that the losses of volatiles from conventional brewing, spray-drying, and vacuum freeze-drying are quite high, clearly demonstrating the shortcomings of flavor retention by each of the prior art processes.

SUMMARY OF THE INVENTION

This invention is concerned with improving the recovery of natural coffee flavors, both volatile and non-volatile, based on even-soluble solids, in the form of a six to eight fold aqueous coffee beverage concentrate at yields of about 18% non-volatile solubles. The invention is carried out in a sealed vertical column of finely ground roast coffee with height-to-diameter ratio of at least 6 to 1, using hot water upflow but collecting the top effluent extract at substantially room temperature. This procedure traps the coffee volatiles in the ambient extract as they are driven out in the sealed column from the coffee granules.

Emphasis is placed on "cup yield" rather than the yield of non-volatile solubles. Normally, each pound of finely ground roast coffee will, in this invention, yield 1 quart to 1 liter of beverage concentrate, which on dilution to beverage strength will make at least 50 delicious about 1.0% non-volatile solubles.

In the drawings:

BRIEF DESCRIPTION OF THE DRAWINGS

FIG. 1 is a diagrammatic view in elevation and in section of a coffee extraction device and system embodying the principles of the invention; and FIG. 2 is a diagram of a system having three such columns in series.

DESCRIPTION OF A PREFERRED EMBODIMENT

A stainless steel vertical column 10 less than nine inches in diameter and with a height-to-diameter ratio of at least 6 to 1 has a perforated bottom retainer 11, for admitting feed water while simultaneously keeping the coffee granules above the retainer 11. The column 10 is filled with finely ground freshly roasted coffee beans 12, and the column 10 is vibrated to compact the ground coffee 12 until the fill density is close to 0.45 grams per cubic centimeter or 1 pound per liter. The range of particle analysis for the granulation lies between commercial "fine" grind and commercial "single cup vending machine" grind which are as follows:

WEIGHT PERCENT GRANULES COFFEE ON EACH SCREEN

| | U.S. screen mesh | | | | |
|---|---|---|---|---|---|
| | +20 | +28 | −28/+35 | −35/+48 | −48 |
| Mm. opening | 0.086 | 0.051 | 0.045 | 0.028 | PAN |
| Commercial grind: | | | | | |
| Fine—100% −14 (coarsest) | [70% (+20+28)] | | 30 | | |
| Single cup vend—100% −20 (finest) | | 10 | 35 | 35 | 20 |

A pressurized water supply 13 (which may be good tap water) is applied through a pressure-regulating valve 14 to a flow regulating valve 15 to give a desired flow at a pressure of up to 60 p.s.i.g. Pressure at the base of the column 10 naturally equalizes the set flow of 10 to 20 gallons per hour per square foot of column inside area, and may be measured by a flow meter 16. Initially, the pressure of the feed is only a few p.s.i.g., and it may rise to 20 or more p.s.i.g. toward the end of the extraction cycle, but should never exceed 60 p.s.i.g., even if some small sacrifice in flow occurs.

The feed water then flows to a thermostatically controlled water heater 17 having an accompanying pressure guage 18 and a therometer 19 to give a temperature usually of 185° ± 5° F., though somewhat governed by heat loss from uninsulated column 10; hence, its geometry.

The upflow of water from the heater 17 goes through a removable cap 20 and the perforated retainer 11 into the coffee 12 and the first flushes out interstitial air and liberates carbon dioxide, thereby eliminating oxygen that can oxidize the aromatic aldehydes, as well as flushing out the carbon dioxide gas, which can otherwise cause channeling of aqueous flows and excessive foam. The fineness of grind contributes to the effective gas displacement, the wetting of the granules, and the minimal channeling of the flow. The range of fineness is such that sufficient structural strength is left in the granular bed for aqueous flow interstitially, yet is not so soft as to cause compacting of the bed and plugging of flow in the column under the feed pressures stipulated.

The coarser side of the fine grind range is used for larger diameter columns 10, such as 9-inch columns, whereas the finer side of the range may be used for smaller diameter columns 10 such as 2-inch diameter columns. Further refinements in conditions may be desirable for different types of beans, different levels of roast, etc. and these will be apparent to those skilled in this art.

The effluent from the column 10 may flow out through a perforated retainer 21 and a quickly removable cap 22 and via a dial thermometer 23 to a coil 24 in an ice water bath 25, when the chilled effluent drops into a chilled extract receiver 26.

The feed water flow indicated corresponds to about a 20 to 60 minute filling time for the column 10 and an equal extract drawoff time. The amount of water used is close to three pounds of water per pound of roasted and ground coffee. For example, at 16% nonvolatile solubles yield (that is, 0.16 pounds solubles per 2 pounds of water in drawn-off effluent of a non-volatile solubles concentration of 8%) the residual spent grounds would hold 1.0 pound of water. Note how this compares to the 20 pounds of water used per pound of drip-grind roast coffee in urn brewing.

The ambient temperature effluent is rich in aromatics, has substantially no oil, wax, or sediment. While most of the effluent will leave the column at 70° F., about the last 20% of effluent may rise in temperature to 150° F. depending on the specific properties and conditions already mentioned.

An essential feature of this invention is the balancing of column design and coffee properties with operating conditions, so that the input heat of the feed water is mostly dissipated in heating the column of roasted and ground coffee, while delivering the essential volatile and non-volatile constituents in the ambient effluent. This corresponds by volume as follows: One liter of ground roast coffee gives one liter of effluent beverage concentrate, or 1 pound finely ground roast coffee gives one quart or liter of ambient effluent beverage concentrate. Therefore, 50 cups of ultimate beverage per quart of effluent is also 50 cups per pound of roast and ground coffee. These 50 cups are more aromatic and flavorable than coffee made by any other known means today.

Although it is possible to obtain non-volatile solubles concentrations above 10%, this is not done, because phospholipids, which are of a textural taste nature are coalesced more and more as a yield of 15% non-volatile solubles is approached, since a significant part of the non-volatile solubles is mineral salts.

The effluent product is ready for use without need for any filtration, centrifuging, concentrating, or adjustment. Ideally the product should pass through the ice water cooler 24, 25 so that the collected effluent coffee beverage concentrate can be promptly stored in a refrigerator at 35° to 40° F. until used as a beverage. At 40° F., the aromatic and flavor constituents appear to have a shelf life of at least 8 weeks by professional standards, which probably corresponds to 12 weeks by lay standards.

The beverage concentrate may be frozen for indefinite storage life at −10° F. at least for several years. This ambient drawoff technique captures about 90% volatiles in the first half of the concentrate drawoff. The residue spent grounds from the column have little to no aromatics left of a desired nature.

The unique control of heat balance input of the present invention and output provides a high volatiles retention factor that heretofore was not attainable in either brewing or extraction processes.

FIG. 2 shows a system having three columns 10, 10a and 10b, each like the column 10, with a conduit 27 leading from the top of the first column 10 to the bottom of the next column 10a and a conduit 28 leading from the top of the column 10a to the bottom of the next column 10b. The operation here is basically the same as before except that the additional columns in series provide an improvement in both the cup yield and the solubles yield.

Example I

A two inch pipe with 2.07 inch inside diameter, 20 inches long ($H/D=10/1$) has a volume of one liter. Below the 2-inch column is a thermostatically controlled hot water supply. A perforated retainer at the base of the column supports extra fine ground roast coffee beans, one pound of which is filled into the column while vibrating the column. The top perforated retainer is put into position, the top of the column sealed, and feed water flow is started and maintained at 40 cc./min. The 180° F. feed water rises up the column, but the lower part of the wall of the column is only about luke warm when ambient effluent first comes off in about sixteen minutes. The effluent temperature is ambient for about 15 minutes, thereafter slowly rising to about 120° F., for another 5 minutes, and to 140° F. by 25 minutes, the total drawoff time. A liter of effluent concentrate has been collected at 7.8% non-volatile solubles, and 20 ml. of concentrate make a satisfyingly strong five-fluid-ounce cup of beverage. The effluent has been chilled to 40° F. as collected and subsequently mixed and stored in a 40° F. refrigerator for future use. A one pound roast and ground coffee sample has been transfixed.

Example II

A 4-inch outside diameter stainless steel tube (11 liter) 60 inches long ($H/D=15$) is filled with 11 pounds fine grind roast coffee. Feed water at 180° F. enters the bottom of the column at 160 cc./min.; effluent starts at ½ hour at ambient, and remains at ambient until 1½ gallons of effluent are collected. Thereafter, the effluent temperature rises to 130° F. in the second gallon of effluent and to 145° F. by the third and final gallon. The effluent has 7.6% non-volatile solubles, and ⅔ fluid ounce (20 ml.) per five-fluid-ounce cup beverage makes a satisfyingly strong cup of coffee full of aroma and natural flavor. Effluent was collected in 54 minutes, was mixed in a premix tank, and having been chilled to 38° F. was placed into a refrigerator for later institutional and vending use. Feed water pressure during most of the run rose to 60 p.s.i.g. and remained there.

To those skilled in the art to which this invention relates many changes in construction and widely differing embodiments and applications of the invention will suggest themselves without departing from the spirit and scope of the invention. The disclosures and the description herein are purely illustrative and are not intended to be in any sense limiting.

I claim:

1. A batch extraction process for finely ground roast coffee beans, comprising:
    placing finely ground roast coffee as a dense stationary bed in a vertical column no greater than nine inches in diameter and having a height-to-diameter ratio for the coffee bed of at least 6 to 1,
    feeding water into the bottom of said column at a temperature of about 180° F. and at a pressure not exceeding 60 p.s.i.g. at a flow rate requiring less than one hour to fill the column with water, and
    withdrawing in less than one hour from the top of said column as effluent an aqueous coffee beverage concentrate, the temperature of the effluent ranging from near ambient initially to no higher than 150° F. at the end of the extraction process, as a result of the preceding steps, the upflow of water purging gases and systematically wetting the coffee granules,
    said water being provided at a rate of three pounds of water per pound of said finely ground coffee to give an aromatics-rich effluent at a rate of about one quart of effluent per pound of said finely ground coffee,
    said effluent being a beverage concentrate about six-fold stronger than conventional potable beverage and dilutable to normal strength coffee at a rate giving a five-fluid-ounce cup yield of about fifty cups per quart of effluent and per pound of original roast and ground coffee beans used.

2. The process of claim 1 in which at least two said columns are used in series, feeding effluent from the top of one column to the bottom of the succeeding column.

3. The process of claim 1 wherein the effluent is passed through an ice-water bath and then collected at a temperature of about 40° F.

4. The product produced by the process of claim 1.

5. An extraction process for producing an aromatics-rich flavorful effluent beverage concentrate about six-fold stronger than conventional potable beverage, having a non-volatile soluble content of about 8% and containing about 90% of the volatiles of the roasted and ground coffee from which it is made, comprising:
    compacting finely ground roast coffee with granules less than one millimeter in diameter to a density of about one pound per liter in a vertical column no greater than nine inches in diameter and having a height-to-diameter ratio of at least 6 to 1,
    feeding water at a rate of three pounds of water per pound of roast and ground coffee into one end of said column at a temperature of about 180° F. and at a pressure ranging from less than 20 p.s.i.g. initially to no more than 60 p.s.i.g. at the end of the extraction process and never exceeding 60 p.s.i.g. and at a flow rate of about ten to twenty gallons per hour per square foot of inside column area, requiring less than one hour to fill the column with water, and
    withdrawing effluent in less than one hour from the other end of said column,
    the flow of water purging gases and systematically wetting the coffee granules,
    said effluent being an aqueous coffee beverage concentrate of about one quart per pound of ground roast coffee and issuing at temperatures in the range from near ambient initially and for most of the time to never higher than 150° F.,
    said effluent being dilutable to 250 ounces per quart of normally strong beverage and representing a five-fluid-ounce cup yield of about fifty cups per quart of effluent and per pound of original roast and ground coffee beans used.

6. The product produced by the process of claim 5.

7. The process of claim 5 wherein the effluent is passed through an ice-water bath and then collected at a temperature of about 40° F., at which temperature it has a shelf life of many weeks.

8. The process of claim 7 wherein said effluent is frozen for indefinite storage life at −10° F.

9. The process of claim 5 wherein said effluent is diluted to give said 250 ounces.

10. The process of claim 5 wherein the grind is in the range of between 70 to 100% by weight passing through a 20 mesh screen with 0.86 millimeter openings; and with up to 20% passing through a 48 mesh screen with 0.28 millimeter openings.

References Cited

UNITED STATES PATENTS

| | | | |
|---|---|---|---|
| 2,629,663 | 2/1953 | Fogler et al. | 99—71 |
| 3,700,463 | 10/1972 | Bolt et al. | 99—71 |
| 3,089,772 | 5/1963 | Bowden et al. | 99—71 |
| 3,720,518 | 3/1973 | Galdo et al. | 99—71 |

OTHER REFERENCES

Sivetz et al.: *Coffee Processing Technology*, vol. I, pp. 325, 336, 339, 345–348, 358, 359, 375.

FRANK W. LUTTER, Primary Examiner

N. F. GREENBLUM, Assistant Examiner

U.S. Cl. X.R.

426—432, 433

UNITED STATES PATENT OFFICE
CERTIFICATE OF CORRECTION

Patent No. 3,830,940                    Dated August 20, 1974

Inventor(s) MICHAEL SIVETZ

It is certified that error appears in the above-identified patent and that said Letters Patent are hereby corrected as shown below:

Column 2, line 54, after the word "delicious" insert --five-fluid-ounce cups of beverage average strength at--; line 56, "In the drawings" should be inserted after "BRIEF DESCRIPTION OF THE DRAWINGS".  Column 3, line 27, after the word "feed" insert --water--;  line 33, "therometer" should read --thermometer--.

Signed and sealed this 19th day of November 1974.

(SEAL)
Attest:

McCOY M. GIBSON JR.  
Attesting Officer

C. MARSHALL DANN  
Commissioner of Patents